(12) United States Patent
Kobayashi et al.

(10) Patent No.: US 6,175,596 B1
(45) Date of Patent: Jan. 16, 2001

(54) PICTURE SIGNAL ENCODING METHOD AND APPARATUS

(75) Inventors: Hiroshi Kobayashi; Kyoko Fukuda, both of Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 09/019,947

(22) Filed: Feb. 6, 1998

(30) Foreign Application Priority Data

Feb. 13, 1997 (JP) .................................................. 9-029391

(51) Int. Cl.[7] ...................................................... H04N 7/12
(52) U.S. Cl. ...................... 375/240.27; 348/606; 382/275
(58) Field of Search ................................... 348/606–609, 348/625–631, 699–700, 420.1, 384.1, 390.1; 382/199, 266, 268–269, 275; 375/240.26, 240.27, 240.29

(56) References Cited

U.S. PATENT DOCUMENTS

| 5,081,692 | * | 1/1992 | Kwon et al. | 382/263 |
|---|---|---|---|---|
| 5,173,769 | * | 12/1992 | Hashimoto | 358/520 |
| 5,367,629 | * | 11/1994 | Chu et al. | 382/253 |
| 5,610,729 | | 3/1997 | Nakajima | 358/463 |
| 5,737,451 | * | 4/1998 | Gandhi et al. | 382/268 |
| 5,781,184 | * | 7/1998 | Wasserman et al. | 345/202 |
| 5,819,035 | * | 10/1998 | Devaney et al. | 709/202 |
| 5,844,614 | * | 12/1998 | Chong et al. | 348/420 |
| 5,848,181 | * | 12/1998 | Ogata | 382/169 |
| 5,852,475 | * | 12/1998 | Gupta et al. | 348/606 |
| 5,883,983 | * | 3/1999 | Lee et al. | 382/268 |
| 5,909,249 | * | 6/1999 | Sathe et al. | 348/403 |
| 5,920,356 | * | 7/1999 | Gupta et al. | 348/606 |
| 5,933,542 | * | 8/1999 | Chang et al. | 382/264 |
| 5,990,955 | * | 11/1999 | Koz | 348/390 |

FOREIGN PATENT DOCUMENTS 0 659 019   6/1995   (EP) .
WO 96/42165  12/1996  (WO) .

OTHER PUBLICATIONS

Hiroyuki Okada et al: "An Adaptive Image Quality Improvement Method for DCT Coding Schemes" Proceedings of the Picture Coding Symposium (PCS), Lausanne, Mar. 17–19, 1993, No.–, Mar. 17, 1993, Swiss Federal Institute of Technology, pp. 13.20/A–13.20/B, XP000346472.

Liu, T–S et al: "Adaptive Post–Processings Algorithms for Low Bit Rate Video Signals" Proceedings of The International Conference on Acoustics, Speech and Signal Processing (ICASSP), I. Image and Multidimensional Signal Processing, Apr. 19–22, 1994, vol. 5, No. Conf. 19, Apr. 19, 1994, Institute of Electrical and Electronics Engineers, pp. V–401–V–404, XP000533748.

* cited by examiner

*Primary Examiner*—Vu Le
(74) *Attorney, Agent, or Firm*—Frommer Lawrence & Haug, LLP.; William S. Frommer; Gordon Kessler (57) ABSTRACT

A picture signal processing method and apparatus in which the block distortion or the mosquito noise generated on picture compression/expansion using block encoding or the like is removed and picture quality correction such as contour enhancement is carried out effectively. Compression-encoded picture signals are expanded and decoded by a MPEG decoder 106 and the decoded picture signals are sent to a noise reducing circuit 107. The noise reducing circuit 107 reduces the noise by block distortion reduction or by field recursive type noise reduction. The resulting noise-reduced or noise-freed picture signals are sent to a picture quality correction circuit 108, which then performs picture quality correction, such as contour enhancement.

10 Claims, 12 Drawing Sheets

PICTURE SIGNAL ENCODING METHOD AND APPARATUS

BACKGROUND OF THE INVENTION

1. Field of the Invention

This invention relates to a picture signal processing method and apparatus. More particularly, it relates to a picture signal processing method and apparatus in which, in compression encoding and decoding input data, such as still picture data or moving picture data, using block encoding of blocking and DCTing the input data, distortion or noise can be removed effectively.

2. Description of Related Art

As an encoding system for efficiently compression-encoding still picture data or moving picture data, there is known block encoding such as block DCT (discrete cosine transform) encoding.

In compressing/expanding picture data by this block encoding, block distortion (block noise) tends to be produced, such that, the higher the compression factor, the larger becomes the distortion. This block distortion is produced by the fact that DCT is executed in a closed space in a block without taking account of the correlation beyond the block boundary. Thus, continuity cannot be maintained in the block boundaries, so that the deviation in the playback data value at the boundary area to the neighboring blocks is perceived as noise. The block distortion, produced on block encoding picture data, exhibits certain periodicity and hence is perceived more readily than the usual random noise so that it proves to be a significant factor in producing picture quality deterioration.

For reducing this block distortion, there is disclosed in Ida and Datake "Noise Removing Filter in MC-DCT Encoding System", Extended Abstract to Spring Meeting of Society of Electronic Information Association, 1990, 7–35, a technique of employing the quantization step size for setting the filter on/off or of performing processing a plural number of times under varying the proceeding direction for preserving the edge as the information proper to a picture for removing the noise. There is also disclosed in Izawa, "Characteristics of Adaptive Noise Removing Filter in Picture Block: Encoding", a report by Technical Department of Shinshu University, No.74, pp.89–100, a technique of extracting even ambient blocks to execute DCT to remove noise frequency components.

With the former method, processing is simpler, however, the high-frequency components in a picture are lost. This point needs to be corrected, as in the latter method, so that there will be no fear of loss of the high frequency components.

As a method for removing the block distortion or mosquito noise, produced on picture compression/expansion thereafter compression, there is proposed an algorithm of using prediction of local statistic quantities, such as picture flatness, and the block-based noise quantities from the coding information, pixel-based noise prediction and adaptive filtering by the least square method, for removing the noise.

The mosquito noise means a ringing output picture distortion produced by high frequency components in the quantization error.

Meanwhile, it is known to correct an input picture by picture quality correction, such as by contour enhancement, for improving the picture definition. If picture quality correction, such as contour enhancement, is effected at the time of picture compression/expansion accompanying block encoding, the above-mentioned block distortion or mosquito noise is emphasized to render it difficult to improve the picture quality sufficiently.

In e.g., a so-called video CD player, there is proposed a structure in which the noise is removed by a field recursive type noise filter, periodic signals are appended by a NTSC encoder, the resulting signal is converted by a D/A converter into analog signals and the resulting analog signals are processed by a contour enhancement circuit for improving the picture definition.

However, in this case, the block distortion or the mosquito noise, not removed by a field recursive type noise reducer, is also amplified by the contour enhancement circuit to render it difficult to achieve sufficient improvement in the picture quality.

SUMMARY OF THE INVENTION

It is therefore an object of the present invention to provide a picture signal processing method and apparatus whereby reduction in the block distortion or the mosquito noise at the time of block encoding, such as DCT, and correction of the picture quality, such as contour enhancement, can be realized effectively.

Thus, in decoding and processing compression-encoded picture signals, according to the present invention, the decoded picture signals are reduced in noise and subsequently the noise-reduced picture signals are corrected for picture quality. This enables picture quality correction, such as contour enhancement, to be performed effectively.

Specifically, the quantization distortion or noise, such as block distortion or mosquito noise, generated on picture quality compression, such as block DCT encoding, is first reduced or removed, after which picture quality correction, such as contour enhancement, is performed. This realizes effective removal of block distortion or mosquito noise and picture quality correction, such as contour enhancement.

Moreover, when reducing the noise, the noise in the frame of the picture quality is first reduced, and subsequently the noise generated between the frames is reduced, thus effectively removing the distortion occurring in a frame and the distortion or noise occurring between the frames.

DESCRIPTION OF PREFERRED EMBODIMENTS

Referring to the drawings, preferred embodiments of the present invention will be explained in detail.

Figure 1:
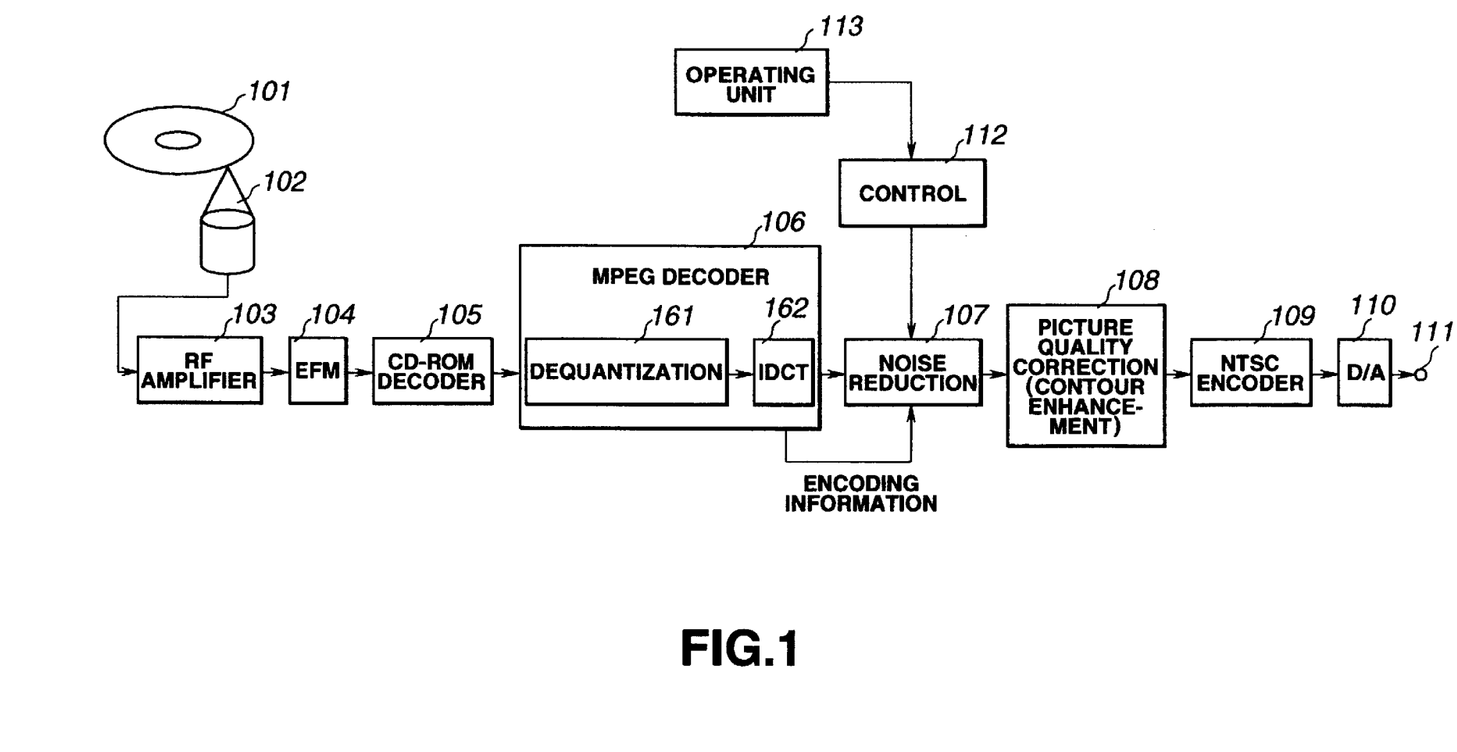
FIG. 1 is a schematic block diagram showing a structure of a picture signal processing device according to the present invention.

FIG. 1 is a schematic block diagram showing a structure of an overall system in case a picture signal processing device according to the present invention is applied to a video CD player.

In FIG. 1, RF signals read from a disc 101, such as a video CD or a CD-ROM, by an optical pickup 102, are entered to a RF amplifier 103. The amplified RF signals are demodulated by an eight-to-fourteen (EFM) demodulation circuit 104 so as to enter a disc recording format decoder, such as a CD-ROM decoder 105, as serial data. The CD-ROM decoder 105 converts the serial data into, for example, a MPEG bitstream signal, which is sent to a MPEG decoder 106.

It is noted that MPEG is an abbreviation of Moving Picture Experts Group for compression encoding of moving pictures of ISO/IEC JTC1/SC29 (International Organization for Standardization/International Electrotechnical Commission, Joint Technical Committee 1/Sub-Committee 29. There are ISO11172 and ISO13818 as the MPEG1 standard and the MPEG2 standard, respectively. In these international standards, ISO11172-1 and ISO13818-1 are standardized under an item of multimedia multiplexing, while ISO11172-2 and ISO13333818-2 are standardized under an item of video, and ISO11172-3 and ISO13818-3 are standardized under an item of audio.

In ISO11172-2 and ISO13333818-2, as the standard for picture compression encoding, picture signals are compression-encoded on the picture basis (on the frame or field basis) by exploiting the temporal and spatial picture correlation. The block DCT encoding is used by way of exploiting the correlation in the spatial direction.

In the MPEG decoder 106, decoding is carried out in accordance with the MPEG1 format. During this decoding, dequantization by a dequantizer 161, inverse DCT processing by an inverse DCT circuit 162 and interpolation or the like processing, if need be, are carried out in this order before outputting.

The picture signals, outputted by the MPEG decoder 106, are entered to a block distortion reducing circuit 107 as a noise reducer. Since these signals contain the block distortion due to compression by MPEG1 or the mosquito noise, these noises are removed by the noise reducing circuit 107. The noise reducing circuit 107 will be explained in detail subsequently. After processing by the noise reducing circuit 107, the signals are corrected as to picture quality, such as by contour enhancement, by a picture quality correction circuit 108, before being sent to a NTSC encoder 109.

The NTSC encoder 109 performs appendage of synchronization signals and modulation of color signals to generate NTSC video signals which are outputted via a D/A converter 110 at an output terminal 111.

In association with the noise reducing circuit 107, there is provided a control circuit 112 employing, for example, a micro-computer. To this control circuit 112 are supplied control signals from an operating unit 113. The operating unit 113 is provided with a control switch for noise reduction, for example, for reduction of block distortion, and performs on/off switching for noise reduction, such as reduction of block distortion. The operating unit 113 is also provided with a control switch for correcting the picture quality, such as contour enhancement, by way of controlling the magnitude of the effect of picture quality correction, such as contour enhancement.

Figure 2:
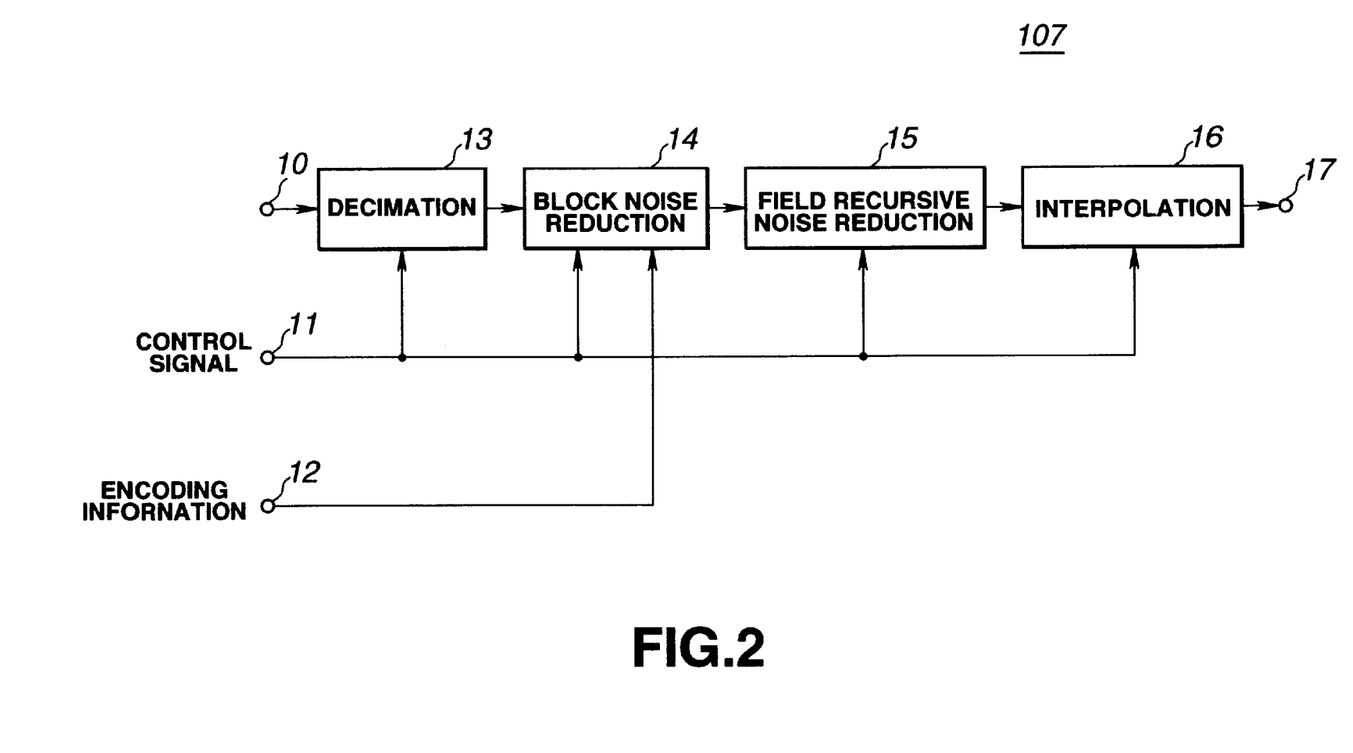
FIG. 2 is a block diagram showing an illustrative structure of a noise reducing circuit according to the present invention.

FIG. 2 shows a block diagram showing an example of the noise reducing circuit 107 in the entire structure of FIG. 1.

Figure 3A:
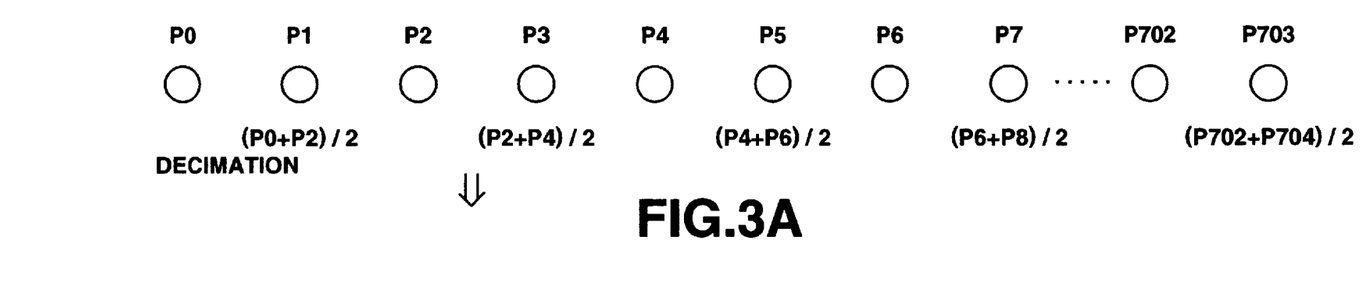
FIG. 3 illustrates decimation and interpolation in the structure of FIG. 2.
Figure 3B:
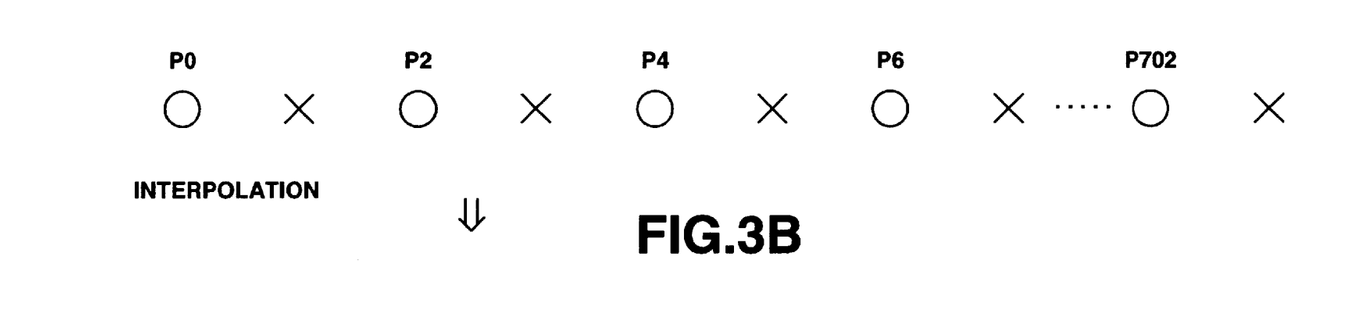

Referring to FIG. 2, to an input terminal 10 are supplied picture signals from the MPEG decoder 106 of FIG. 1. To a decimation circuit 13 is fed e.g., the information on the frame size (resolution as a control signal from the control circuit 112 comprised of a micro-computer or the like shown in FIG. 1. If the frame size is the standard one of, for example, 352 pixels by 240 lines according to the NTSC system, a picture signal output of the MPEG decoder 106 of FIG. 1 is as shown in FIG. 3A, wherein odd-numbered pixels P1, P3, P5, . . . are interpolated with even-numbered pixels P0, P2, P4, . . . with each pixel being a mean value of forward-side and backward-side pixels (P1=(P0+P2)/2 and so forth). Since input picture data to the downstream side block distortion reducing circuit 14 is desirably the non-post-processed original decoded data in view that the data is checked as to block distortion. Therefore, the picture signals of FIG. 3A are decimated by the decimation circuit 13 to produce original decoded data shown in FIG. 3B. If the frame size is a high-definition size, for example, of the NTSC system with 704 pixels by 480 lines, decimation by the decimation circuit 13 is omitted.

Figure 3C:
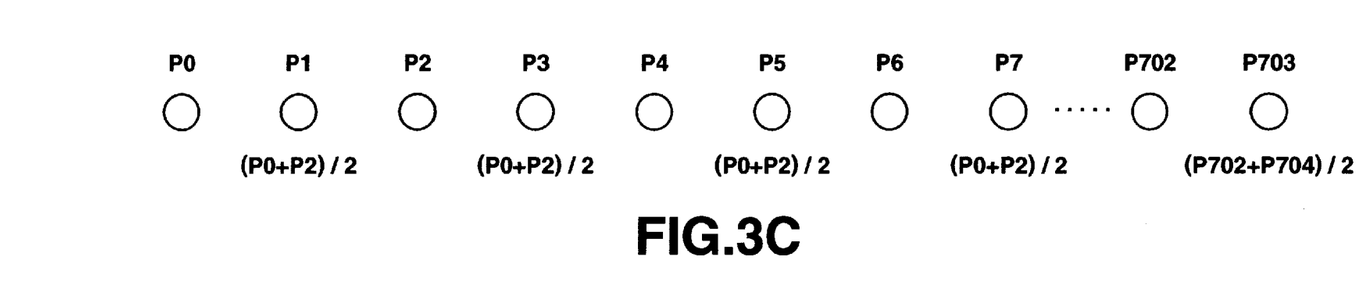

An output signal of the decimation circuit 13 is sent to the block distortion reducing circuit 14 for reducing the block distortion produced by performing the decoding operation which is a counterpart operation of the block DCT encoding described above. The picture signals from the block distortion reducing circuit 14 are sent to a field recursive type noise reducing circuit 15 for removing the noise, such as block distortion, generated between neighboring fields. An output signal of the field recursive type noise reducing circuit 15 is sent to an interpolation circuit 16 so that, if the frame size is of the above-mentioned standard size, the interpolation processing shown at B and C in FIG. 3 is executed. The resulting interpolated signal is outputted at an output terminal 17.

The illustrative structures of the block distortion reducing circuit 14 and the field recursive type noise reducing circuit 15 are explained in detail with reference to the drawings.

Figure 4:
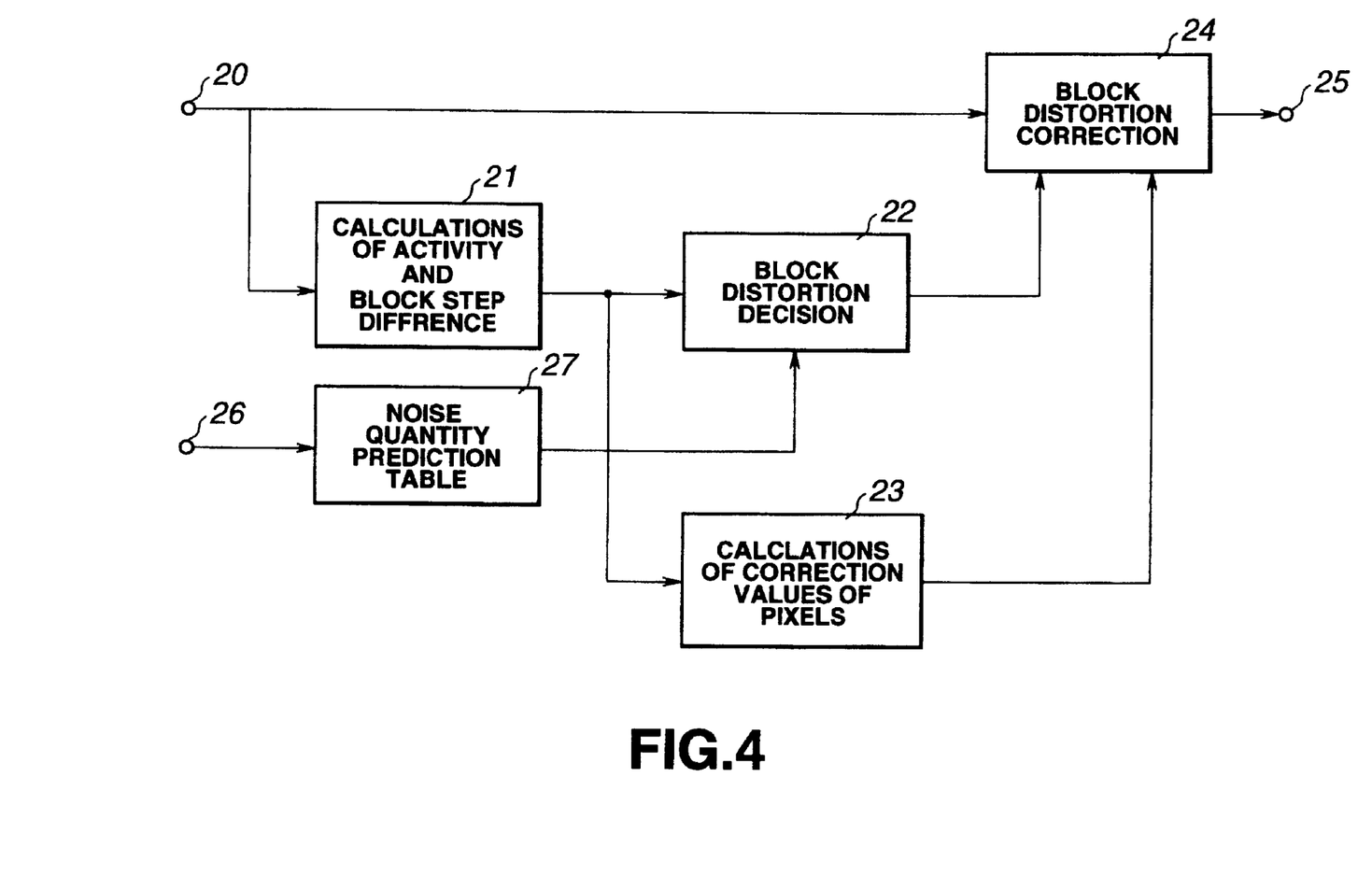
FIG. 4 is a schematic block diagram showing the structure of a picture data block distortion reducing circuit according to the present invention.
Figure 5:
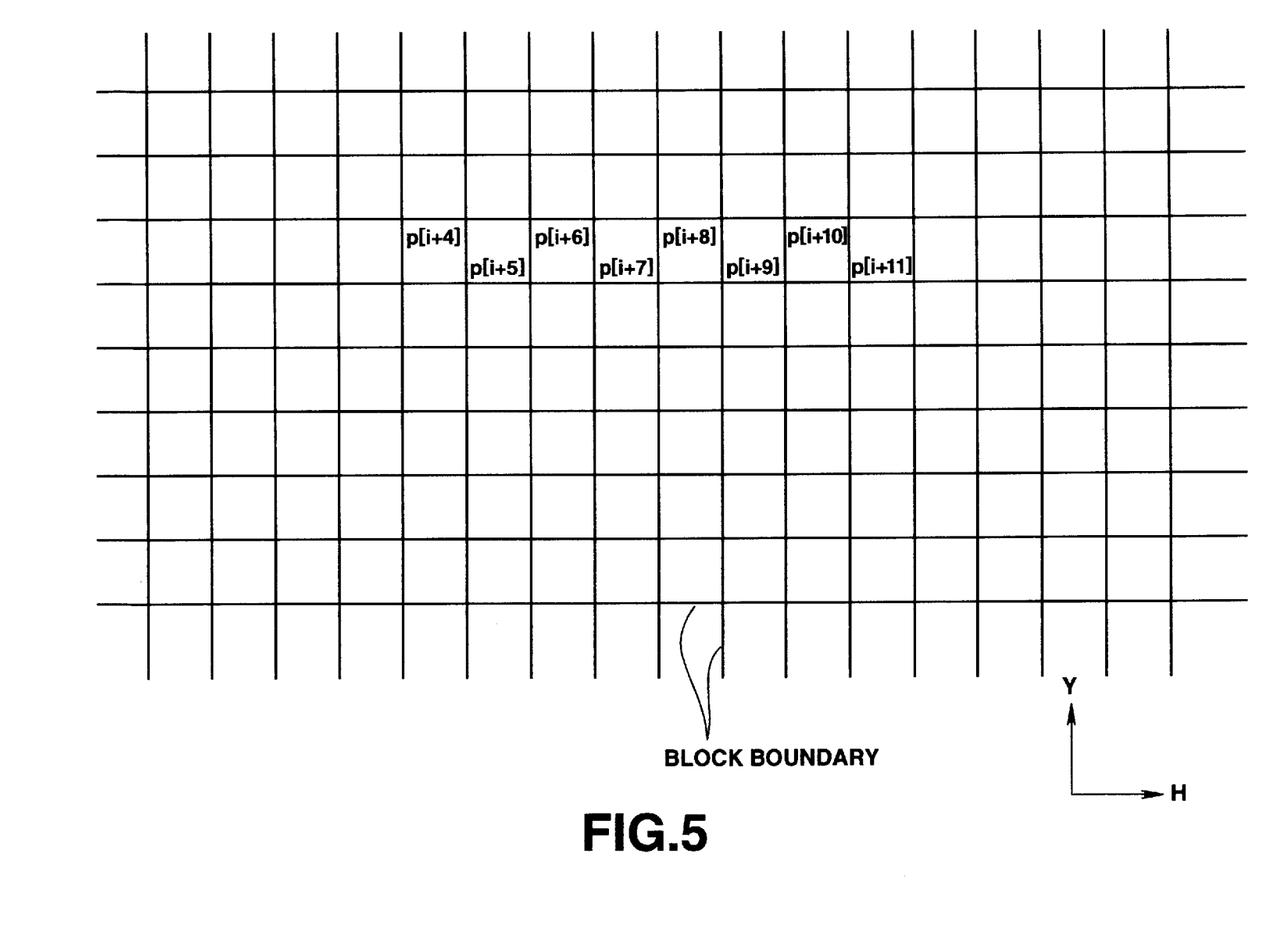
FIG. 5 shows pixels in the vicinity of a block boundary for correcting block distortion.

First, the block distortion reducing circuit 14 is configured as shown for example in FIG. 4. In this figure, to an input terminal 20 are supplied picture data processed with compression coding, such as block coding, and subsequently decoded, for example, picture signals outputted by the MPEG decoder 106 of FIG. 1 and obtained via decimation circuit 13 of FIG. 2. These input data are sent to an activity and block step difference calculating circuit 21 and to a block distortion correction circuit 24.

The activity and block step difference calculating circuit 21 of FIG. 4 calculates activity act, as an average value of differences between neighboring pixels in the vicinity of the block boundary, and the block step difference δ, as a difference between neighboring pixels in the block boundary, and routes these to a block distortion decision circuit 22. The block distortion decision circuit 22 performs condition decision, as later explained, using the activity act and the block step difference δ, for judging whether or not the block distortion exists. If the block distortion is found not to exist, the block distortion correction circuit 24 is responsive to a control signal from the block distortion decision circuit 22 to omit processing of input data entering the terminal 20 and to directly output the data entering the terminal 20 at a terminal 25. On the other hand, there is entered to a terminal 26 the encoding information from, for example, the MPEG decoder 106 of FIG. 1. This encoding information is sent via a noise quantity prediction table 27 to the block distortion decision circuit 22.

The activity and block step difference calculating circuit 21 of FIG. 4 finds, from the pixel data p supplied to the terminal 20, the activity act, as an average value of differences between neighboring pixels in the vicinity of the block boundary, and the block step difference δ, as a difference between neighboring pixels in the block boundary. If the pixels in the vicinity of the DCT block boundary, that is the pixels neighboring to the block boundary and the neighboring pixels, are indicated as

[i+4], p[i+5], p[i+6], p[i+7]|p[i+8], p[i+9], p[i+10], p[i+11]

where | denotes the block boundary, activity act is calculated by $$\mathrm{act} = (|p[i+6] - p[i+5]| + |p[i+7] - p[i+6]| + |p[i+9] - p[i+8]| + |p[i+10] - p[i+9]|)/4 \quad (1)$$

while the block difference δ is calculated by $$\delta b = p[i+8] - p[i+7] \quad (2)$$

Using the activity act and the block difference δ, the block distortion decision circuit 22 judges the block distortion to have occurred if the condition:

$$\mathrm{act} < |\delta b| < \mathrm{Th} \quad (3)$$

is met. In this inequality (3), Th denotes a threshold value.

Figure 6:
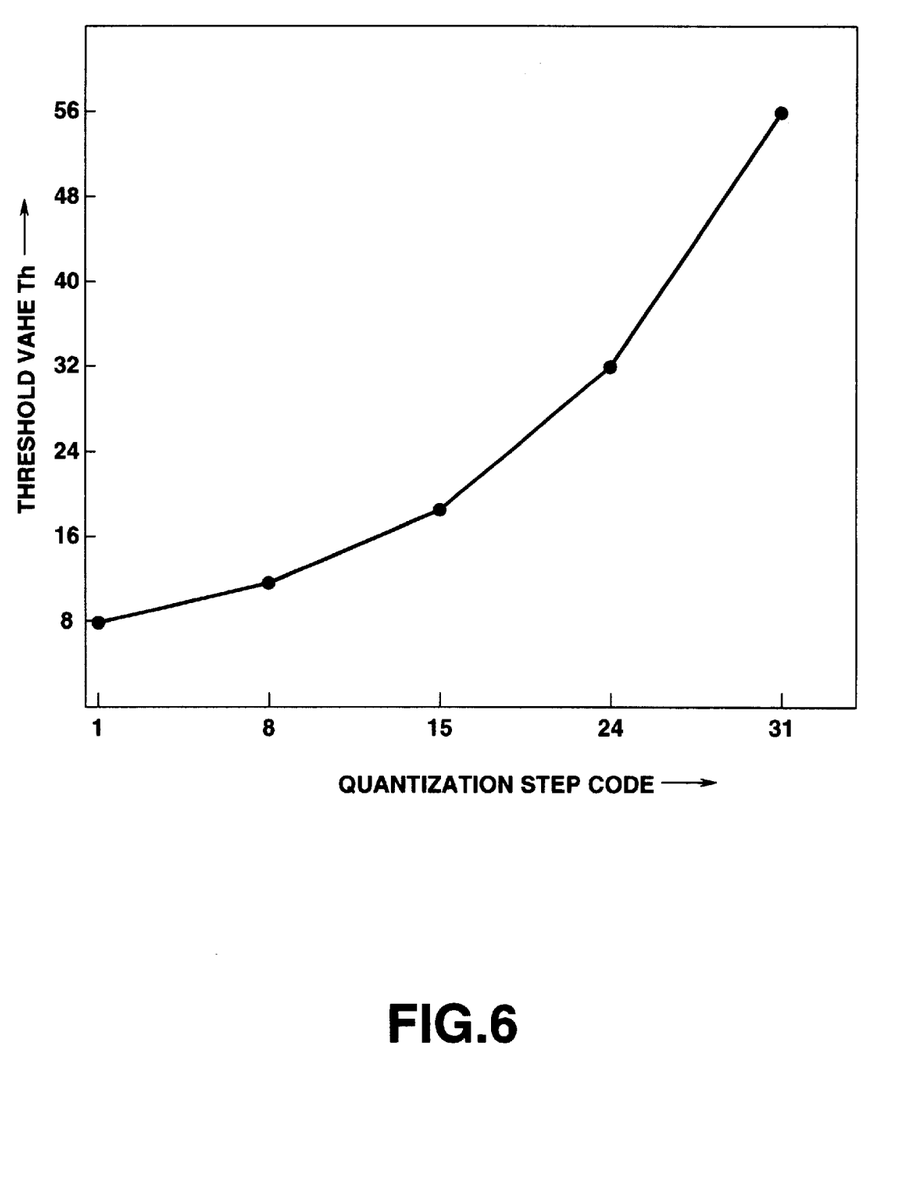
FIG. 6 shows an example of the relation between the quantization step as the encoding information and the threshold value for block distortion discrimination.

As for the threshold value Th, the magnitude of the block distortion (noise quantity) is predicted from the noise quantity prediction table 27, depending on the encoding information from a terminal 26, for example, the value of the quantization step, for varying the threshold value Th. FIG. 6 shows a graph showing an example of the threshold value Th relative to the quantization step as the encoding information in the noise quantity prediction table 27. The example of FIG. 6 exploits characteristics that the rougher the quantization step, the larger becomes the generated noise.

If the block distortion is judged not to exist, the block distortion correction circuit 24 directly outputs the input data at the terminal 20 without processing the data.

Conversely, should the block distortion be found to have occurred, a pixel-based correction value calculating circuit 23 first finds the correction value α by the following equations (4) or (5):

$$\alpha = \delta b - \mathrm{act}: \delta b > 0 \quad (4)$$

$$\alpha = \delta b + \mathrm{act}: \delta b \leq 0 \quad (5)$$

Next, the pixels in the vicinity of the block boundary are found by the following equations (6) to (13):

$$p'[i+4] = p[i+4] + \alpha/16 \quad (6)$$

$$p'[i+5] = p[i+5] + \alpha/8 \quad (7)$$

$$p'[i+6] = p[i+6] + \alpha/4 \quad (8)$$

$$p'[i+7] = p[i+7] + \alpha/2 \quad (9)$$

$$p'[i+8] = p[i+8] - \alpha/2 \quad (10)$$

$$p'[i+9] = p[i+9] - \alpha/4 \quad (11)$$

$$p'[i+10] = p[i+10] - \alpha/8 \quad (12)$$

$$p'[i+11] = p[i+11] - \alpha/16 \quad (13)$$

The block distortion correction circuit 24 corrects the pixels neighboring to the block boundary and the neighboring pixels for block distortion in accordance with the equations (6) to (13) for removing the block distortion. The result is that the step difference of the block boundary following such correction p'[i+8]−p'[i+7] becomes equal to the value of the activity act, as shown by the following equation (14):

$$p'[i+8] - p'[i+7] = (p[i+8] - \alpha/2) - (p[i+7] + \alpha/2) = (p[i+8] - [p[i+7]) - \alpha = \delta b - (\delta b - \mathrm{act}) = \mathrm{act} \quad (14)$$

Figure 7A:
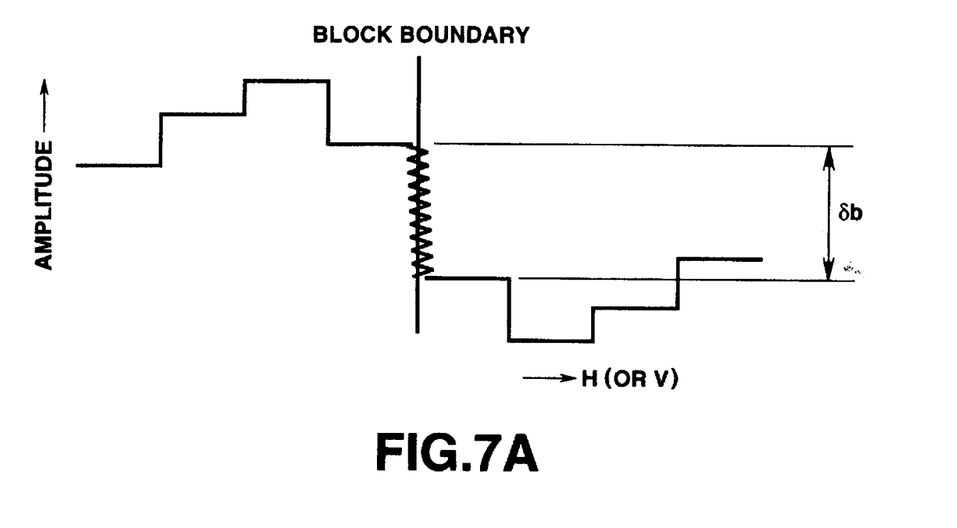
FIG. 7 illustrates the operation of correcting the step difference in the block boundary.
Figure 7B:
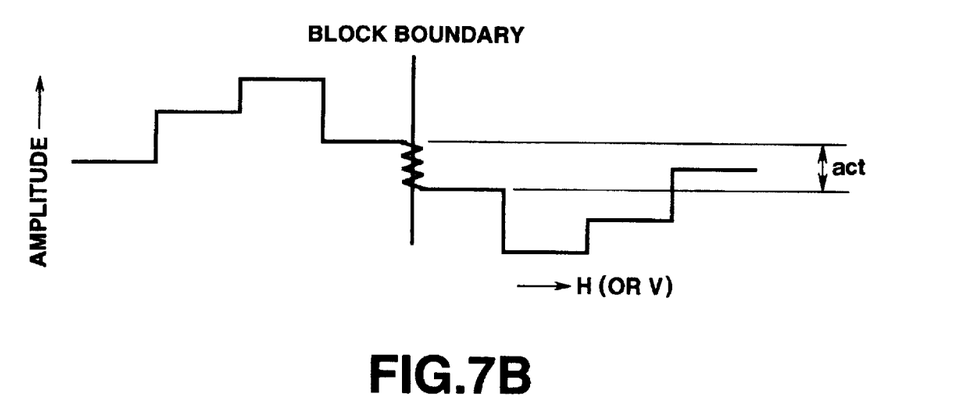

FIG. 7 shows an example of the step difference of the block boundary. In FIG. 7, A and B denote the pre-correction state and the post-correction state, respectively. In FIG. 7, and the abscissa denote the amplitude, that is pixel data values, and the ordinate denotes the pixel position in the horizontal (H) direction and the vertical (V) direction. The step difference δb of the block boundary of FIG. 7A is corrected to the step difference act of the block boundary of FIG. 7B.

Figure 8:
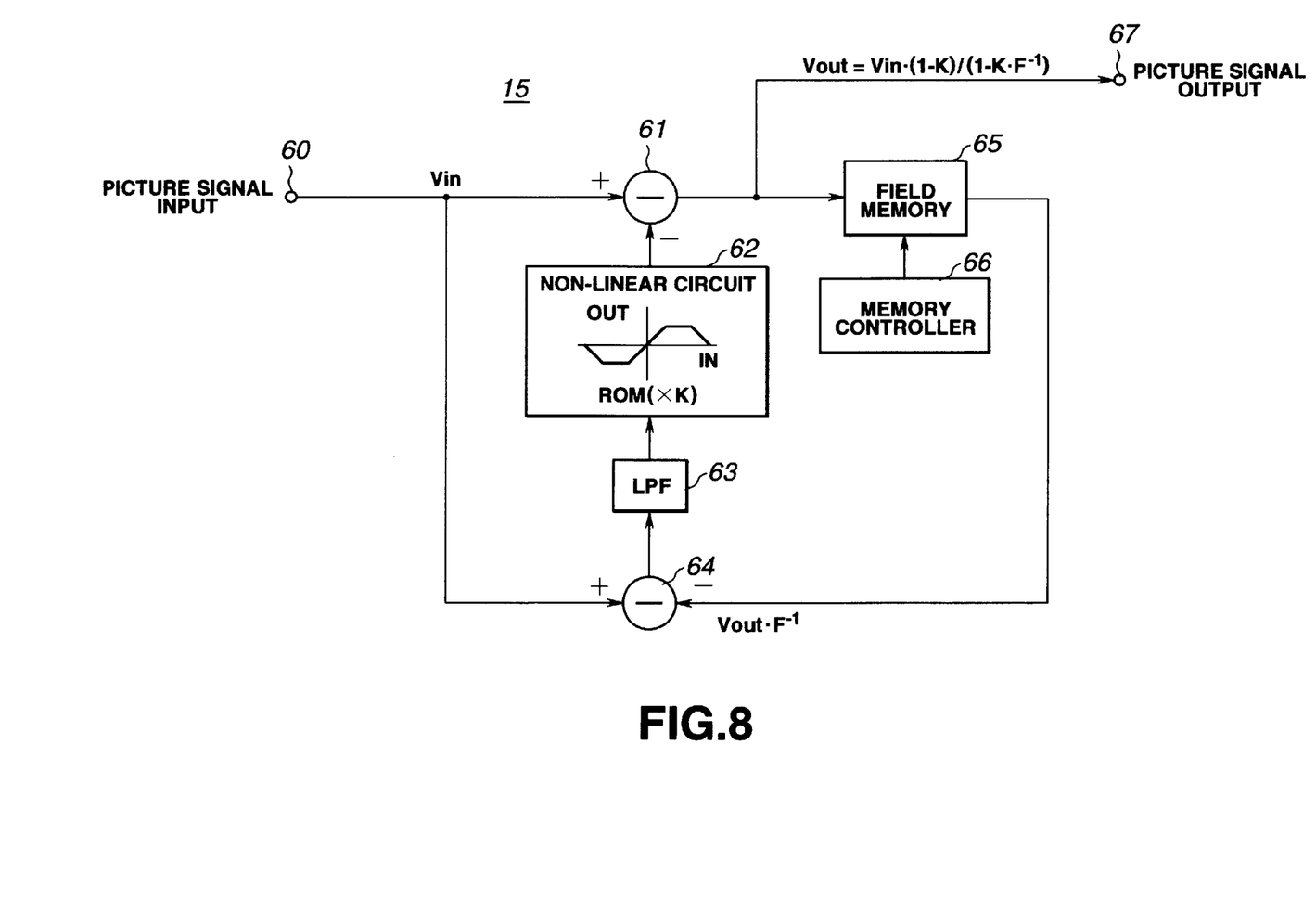
FIG. 8 is a block diagram showing an example of a field recursive type noise reducing circuit.

Referring to FIG. 8, an illustrative example of the field recursive type noise reducing circuit 15 is explained.

To an input terminal 60 of FIG. 8 are entered picture signals from the block distortion reducing circuit 14 of FIG. 2. These input picture signals $V_{in}$ are sent to subtractors 61, 64. An output signal of the subtractor 61 is outputted at an output terminal 67 and written in a field memory 65. A memory controller 66, provided in association with the field memory 65, is used for controlling the write and readout operations in or from the field memory 65, such that readout data of the field memory 65 is delayed one field with respect to the write data. That is, if the output signal is denoted $V_{out}$ and the field delay is denoted as $F^{-1}$, an output signal of the field memory 65 becomes $V_{out} \cdot F^{-1}$. This field-delay output signal is supplied to the subtractor 64, which then subtracts the field-delay output signal $V_{out} \cdot F^{-1}$ from the information processing system $V_{in}$ to output the resulting difference signal.

An output signal of the subtractor 64 is sent via band-limiting low-pass filter (LPF) 63 to a non-linear circuit 62. The non-linear circuit 62 is used for multiplying the output signal with a feedback coefficient K depending on the level of an output signal from the LPF 63 (input signal to the non-linear circuit 62). This non-linear circuit 62 has input/output characteristics of outputting a field difference of a small range as a noise component and of reducing the large field difference to a zero output on the assumption that such large field difference is derived from movement. That is, the non-linear circuit 62 extracts the noise component by exploiting the characteristics that the noise component has only small field-to-field correlation and has a small amplitude.

An output signal $L \cdot (V_{in} - V_{out} \cdot F^{-1})$ of the non-linear circuit 62 is sent to the subtractor 61 so as to be subtracted from the input picture signals $V_{in}$. This is tantamount to subtracting the noise component extracted by the subtractor 61 from the input picture signals $V_{in}$ for producing the noise-reduced output picture signals $V_{out}$.

That is, from $$V_{out} = V_{in} - K \cdot (V_{in} - V_{ou} \cdot F^{-1})$$

$$V_{out} \cdot (1 - K \cdot F^{-1}) = V_{in} \cdot (1-K)$$

the output picture signals $V_{out}$ are given by $$V_{out} = V_{in} \cdot (1-K)/(1 - K \cdot F^{-1}).$$

A contour enhancement circuit, as an illustrative example of the picture quality correction circuit 108 of FIG. 1, is explained with reference to FIG. 9.

Figure 9:
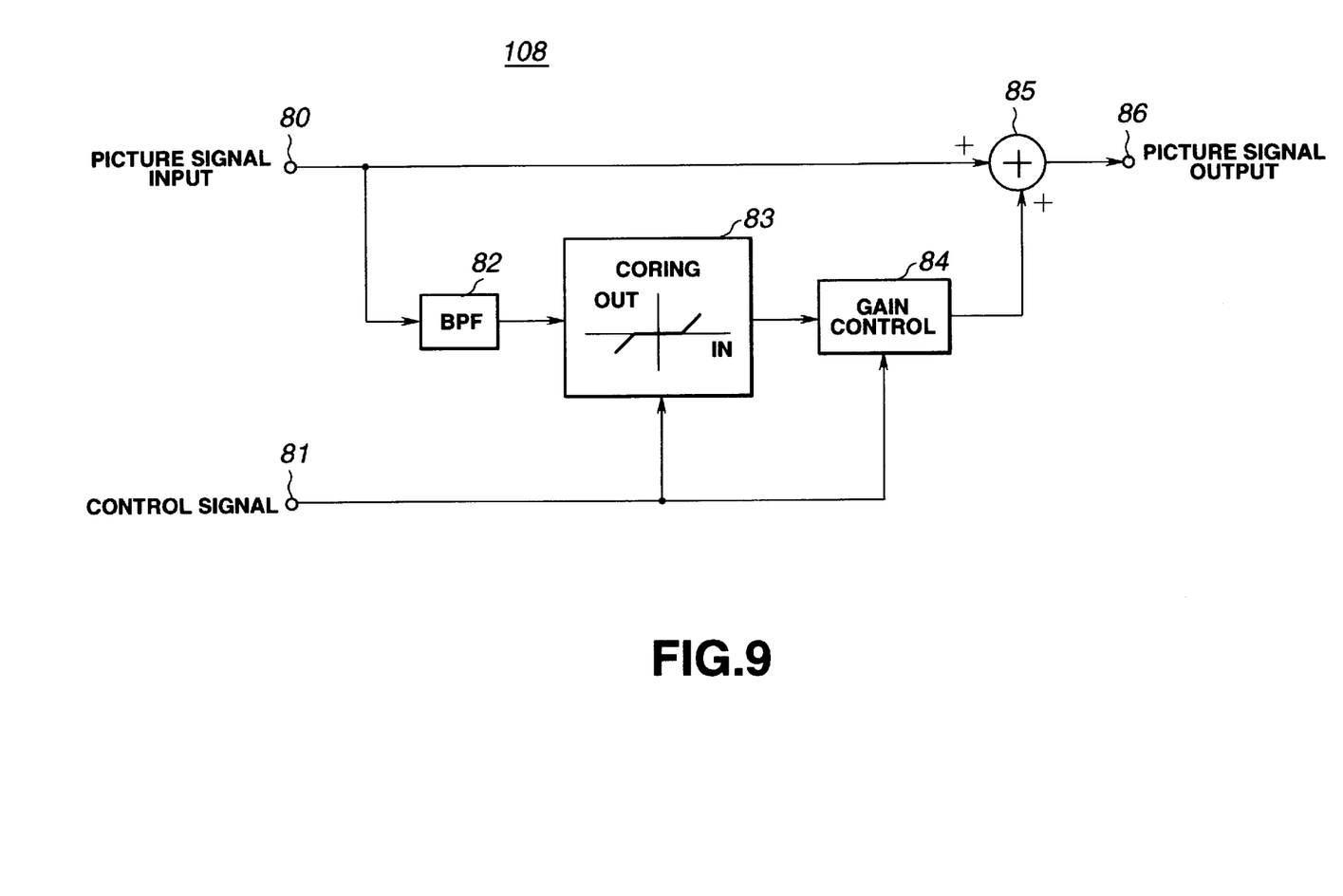
FIG. 9 is a schematic block diagram showing the structure of an example of a contour enhancement circuit as picture quality correction means.

FIG. 9 shows an illustrative structure of a contour enhancement circuit as the picture quality correction circuit 108. Referring to FIG. 9, an output signal of the noise reducing circuit 107 of FIG. 1, more specifically, a picture signal obtained from the field recursive type noise reducing circuit 15 via the interpolation circuit 16 and the output terminal 17, is fed to an input terminal 80. An input signal from the terminal 80 is sent to a BPF (band-pass filter) 82 and to an adder 85. The BPF 82 extracts the mid to high frequency components, such as picture contour components. The extracted contour components are sent to a coring circuit 83 so as to be subjected to non-linear processing (coring processing) for removing noise components corresponding to small-amplitude signals. The resulting signals are sent to a gain control circuit 84 for controlling a correction amount. The resulting signal is sent as a correction signal to an adder 85.

To a control l terminal 81 are sent control signals from a control circuit 1 12, such as a micro-computer of FIG. 1. This control signals is sent to the coring circuit 83 and to the gain control circuit 84. That is, the operating unit 113 of FIG. 1 has a control switch, such as a switch for contour enhancement. The magnitude of the effect of contour enhancement can be controlled by actuating this switch.

This accentuates the mid to high frequency components in the picture signals by the contour enhancement circuit 108 for improving the picture definition.

In the above-described embodiment of the present invention, since the noise, such as block distortion, generated on picture compression by block DCT encoding, is previously removed, the next following picture quality correction, such as contour enhancement, can be carried out effectively.

A modification of the present invention is hereinafter explained.

In the present modification, adaptive processing is performed using the weighted encoding information, in the post-processing, carried out in e.g., a contour accentuating circuit.

That is, it may be contemplated to control the amount of correction of block distortion depending on the magnitude of the step difference of the block boundary for reducing the malfunction ascribable to mistaken judgment on the block distortion. If, in this case, the step difference of the block boundary is large, the amount of correction becomes smaller, so that a small step difference of the block boundary is left. For not emphasizing the residual block distortion, the weighted encoding information is used for effecting adaptive processing for contour enhancement.

Figure 10:
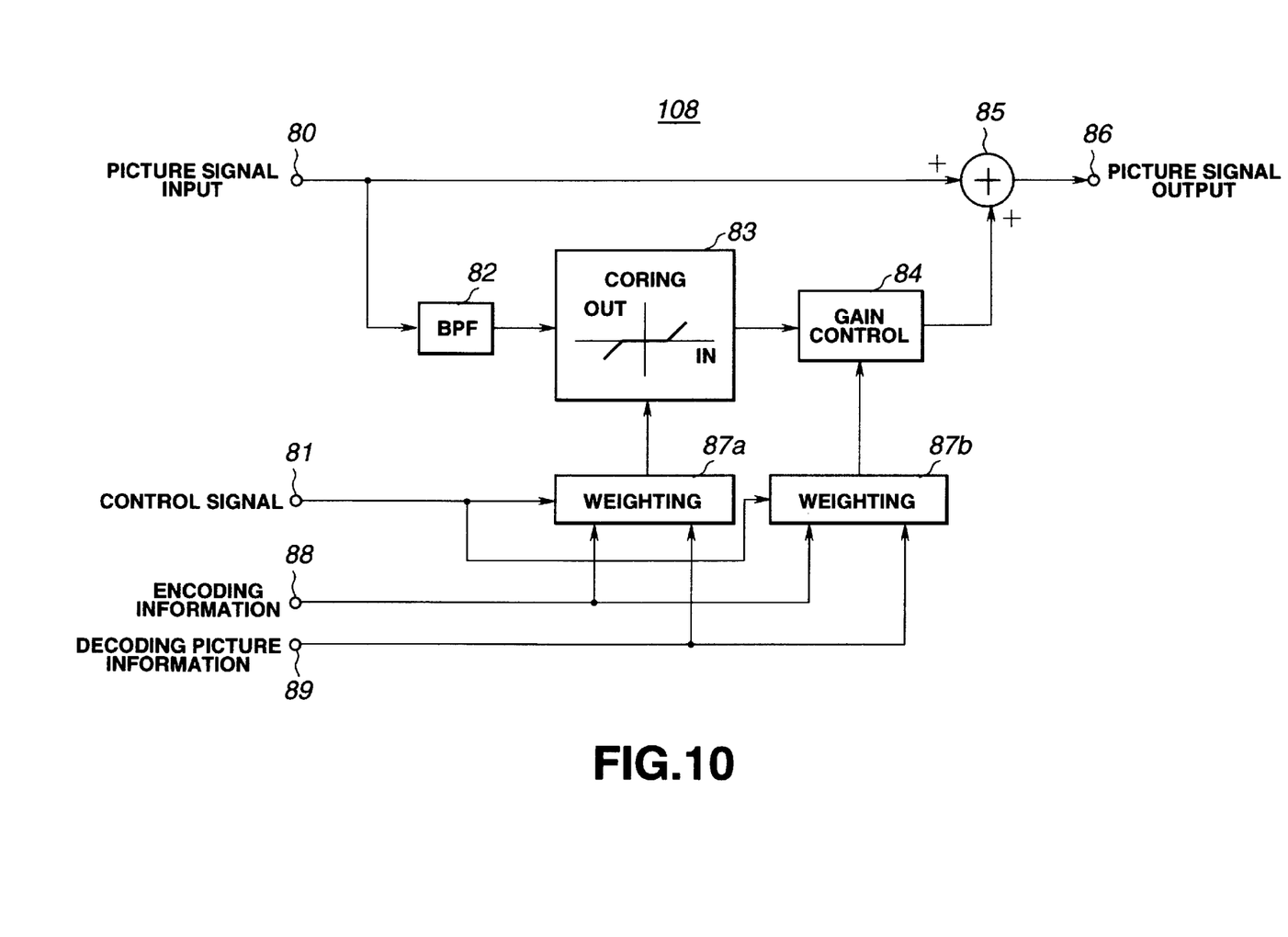
FIG. 10 is a block diagram showing another illustrative example of the contour enhancement circuit.

FIG. 10 shows, in a block diagram, the structure of the contour enhancement circuit in the present modification. In the gain control circuit 84 of FIG. 10, the control signal supplied from the control circuit 112 via terminal 81 is weighted by a weighting circuit 87b by the value of the quantization step as the encoding information from a terminal 88, and the value of the step difference of the block boundary and the distance from the block boundary as the decoding picture information from a terminal 89. The value of the gain G, as a parameter supplied to the gain control circuit 84, is found by, for example, the following equation:

$$G = G_{st} \times (K_Q/8) \times (L_W/4)$$

where $G_{St}$ is the gain setting value in the control circuit 112 of FIG. 1, $K_Q$ is the weighting coefficient of the quantization step, $L_W$ is the weighting coefficient of the boundary distance and ⅛, ¼ are divisors for normalization.

Figure 11:
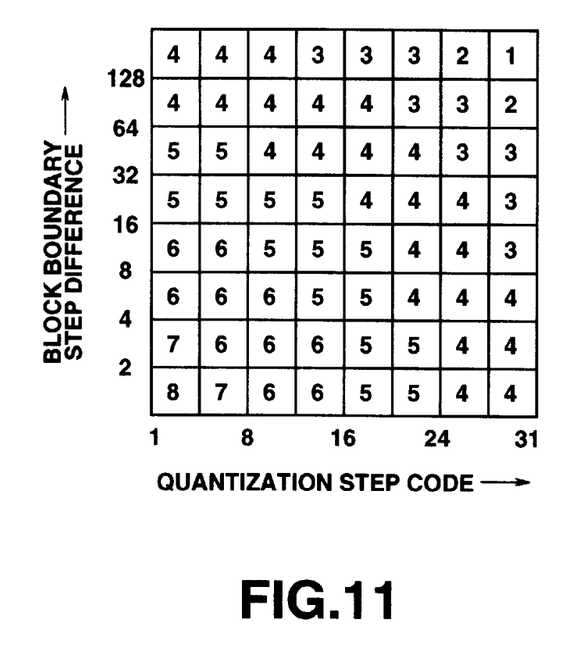
FIG. 11 shows typical quantization step weighting coefficients for the step difference in the block boundary and the quantization step code.
Figure 12:
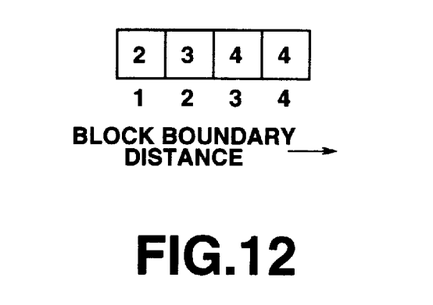
FIG. 12 shows an illustrative example of the boundary separation weighting coefficients for the block boundary separation.

FIG. 11 shows the quantization step weighting coefficients for the quantization step code and the block boundary step difference and FIG. 12 shows the boundary distance weighting coefficients for the block boundary distance.

By way of illustration, it is assumed that, for the gain setting value as a control signal from the terminal 81 of 2, the quantization step code and the block boundary step difference are given, such that, from the table of FIG. 11, the quantization step weighting coefficient is 4, and the distance from the block boundary is given to the table of FIG. 12 to give a value 2 of the boundary distance weighting coefficient. The parameter supplied at this time to the gain control circuit 84, that is the gain G, is $$G = 2 \times (4/8) \times (2/4) = 0.5$$

thus lowering the contour enhancement effect.

This applies also for the coring circuit 83.

Specifically, in the coring circuit 83 of FIG. 10, the parameter as the control signals supplied from the terminal 81 is weighted by the weighting circuit 87a with the value of the quantization step as the encoding information from the terminal 88 and with the distance from the block boundary and the value of the step difference of the block boundary as the decoding picture information from the terminal 89.

Figure 13:
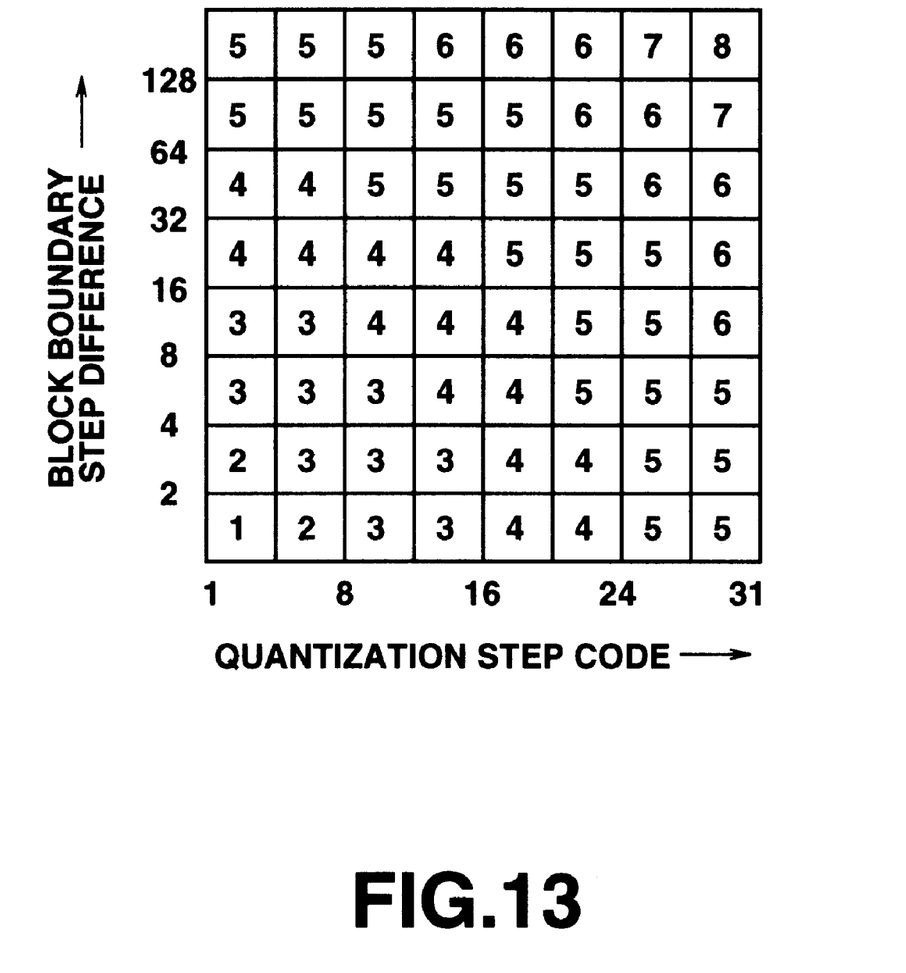
FIG. 13 shows typical coring weighting coefficients for the quantization step codes and the block boundary step difference.

FIG. 13 shows the coring weighting coefficients for the quantization step codes and the block boundary step difference. The value of the parameter C supplied to the coring circuit 83 may, for example, be found by the following equation:

$$C = C_{st} \times K_C \times (L_w/4)$$

where $C_{st}$, $K_C$ and $L_W$ denote the coring setting value, weighting coefficients and the weighting coefficients of the boundary distance, in the control circuit 112 in FIG. 1, respectively, and ¼ is the divisor for normalization.

Meanwhile, the characteristics of FIGS. 10 to 13 are merely exemplary and are not intended for limiting the invention. In case of compression in the above-mentioned MPEG standard, the quantization step is varied on the macro-block basis. Therefore, thee quantization step difference may be added to the block boundary under consideration.

The present invention is not limited to the above-described embodiments. For example, although the foregoing description is directed to the processing in the horizontal (H) direction, the present invention may similarly be applied to processing in the vertical (V) direction. Similarly, the present invention may be applied not only to processing of luminance signals, but to processing of chroma signals.

What is claimed is:

1. A picture signal processing apparatus for decoding and processing compression-encoded picture signals, comprising:

noise reducing means for reducing the noise in the decoded picture signals;

picture quality correction means for correcting the picture quality of the noise-reduced picture signals; and weighting means for finding weighting coefficients of a plurality of pixels based on the encoding information of said picture signals, decoding picture information, the distance of each of said plurality of pixels from the encoding block boundary of block encoding, and a block step difference between two of said plurality of pixels adjacent to, and positioned on opposite sides of said encoding block boundary; wherein picture quality correction by said picture quality correction means is controlled responsive to the weighting coefficients from said weighting means.

2. The picture signal processing apparatus as claimed in claim 1 wherein said noise reducing means at least reduces the block distortion produced in block encoding; and wherein said picture quality correction means performs contour enhancement of an input picture.

3. The picture signal processing apparatus as claimed in claim 1 wherein said noise reducing means reduces the noise in a frame of the picture signals and then reduces the noise produced between frames.

4. The picture signal processing apparatus as claimed in claim 1 wherein said picture signals are made up of luminance signals and chroma signals; and wherein said noise reduction is performed on at least one of the luminance signals and the chroma signals.

5. The picture signal processing apparatus as claimed in claim 1 wherein said noise reduction is performed on at least one of the horizontal direction and the vertical direction of the picture signals.

6. A picture signal processing method for decoding compression-encoded picture signals, comprising:

a noise reducing step of reducing the noise in the decoded picture signals;

a picture quality correction step of correcting the picture quality of the noise-reduced picture signals; and weighting coefficients of a plurality of pixels are found based on the encoding information of said picture signal, decoding picture information, the distance of each of said plurality of pixels from the encoding block boundary of block encoding and a block step difference between two of said plurality of pixels adjacent to, and positioned on opposite sides of said encoding block boundary; wherein picture quality correction in said picture quality correction step is controlled responsive to said weighting coefficients.

7. The picture signal processing method as claimed in claim 6 wherein said noise reducing step at least reduces the block distortion produced in block encoding; and wherein said picture quality correction step performs contour enhancement of an input picture.

8. The picture signal processing method as claimed in claim 6 wherein said noise reducing step reduces the noise in a frame of the picture signals and then reduces the noise produced between frames.

9. The picture signal processing method as claimed in claim 6 wherein said video signals are made up of luminance signals and chroma signals; and wherein said noise reduction is performed on at least one of the luminance signals and the chroma signals.

10. The picture signal processing method as claimed in claim 6 wherein said noise reduction is performed on at least one of the horizontal direction and the vertical direction of the picture signals.

* * * * *